United States Patent Office 3,470,295
Patented Sept. 30, 1969

3,470,295
COMPOSITIONS AND METHODS FOR TREATING POSTTRAUMATIC SHOCK, PAIN AND HEMORRHAGE
Emanuel Revici, 1111 Park Ave., New York, N.Y. 10028
No Drawing. Filed Jan. 12, 1965, Ser. No. 425,075
Int. Cl. A61k 27/14
U.S. Cl. 424—180
4 Claims

ABSTRACT OF THE DISCLOSURE

A therapeutic composition which comprises (a) n-butanol and (b) a member of the group consisting of maltose, inositol, and sorbitol in the relative proportions of from 1:5 to 100:1 parts by weight and the method of treating humans and animals for posttraumatic shock, pain, and hemorrhage with said composition.

---

The present invention relates to compositions capable of counteracting hemorrhage, pain and shock, and especially the noxious effects of trauma. The problem of hemorrhage, pain and shock, along with the noxious effects of trauma following accidents, surgical interventions, caloric, chemical or irradiation burns, or other causes, appear of maximum importance. I first employed butanol which produced relatively good results on hemorrhages, but it was insufficient to control all these conditions, especially the noxious effects of trauma. Accordingly, the principal object of this invention is to provide new preparations which will function efficiently in most of these conditions.

I have found that preparations containing a member of the group formed by the hexane hexols, the disaccharides having an α(alpha) glucoside in their molecule and the disaccharides having a β (beta) galactoside in their molecule, have a high capacity to control hemorrhage, pain and shock, and especially the noxious effects of trauma. Sorbitol, manitol and inositol are members of the first group, while sucrose, lactose and maltose are members of the second group.

I have further found that while the members of both groups have favorable marked effects when administered parenterally, the favorable effects are obtained only with the members of the first group, if administered orally. Furthermore, substances only slightly different from these forming the two groups, such as cellobiase or erythritol are without effects or even showed adverse effects.

In the treatment for the aforementioned conditions, the above mentioned members are used separated or mixed. I have also determined that pharmaceutically acceptable combinations with acids or metals of these agents may be used. Moreover, according to the invention, the agent or agents mentioned above may be utilized together with one or more of other products such as butane-alcohols, that have properties against hemorrhage, pain or shock, and the noxious effects of trauma. From these butane-alcohols, n-butanol, sec.-butanol and 1,4-butanediol have been shown to possess the best pharmacologically desirable properties and were used individually or in mixtures of two or of all those with the above described agents. The mixture of the above described agents with the butane-alcohols is utilized in proportions from 5:1 to 1:100 parts by weight.

According to the invention, from the agent used, whether alone or with butane-alcohols, solutions in water or in iso- or hypertonic solutions can be prepared. These were administered orally for the members of the first group, and by injections or topically for the members of both groups after being made sterile by heating, filtration or other means. The range of solutions of the preparations are from .1% for intravenous infusions to 50% for injections. This concentration for injections is the same for the salts. For oral administration, the members of the first group may be used in their pure form or mixed with therapeutically acceptable material. In order to obtain the desired therapeutic effect, the preparation is administered in doses of up to 30 grams. For topical application, the above mentioned agents, with or without butane-alcohols, are used in their pure form in solutions up to 60% mixed with adequate powder or ointments, or used as sprays. For use as suppositories for hemorrhoids, the products are mixed with a suitable vehicle.

According to the invention the agent or agents mentioned above may be utilized together with solutions of calcium compounds. From these calcium hydroxide, calcium lactate, calcium acid lactate and calcium chloride and calcium lactate with phosphoric acid, have been shown to posses the best desirable properties. The mixture of the above described agents with the calcium compounds solutions is utilized in proportions from 5:1 to 1:100 parts by weight.

According to the invention the agents may be used combined with an amine or with an amino-alcohol, especially amino-butanol.

Toxicity

The toxic dose for mice, using the 10% or 20% solutions of the preparations in subcutaneous, intraperitoneal or intravenous injections, or orally for the first group was seen to be above 1000 mg./1 kgr. The same was seen for rats and rabbits.

Chronic toxicity studies have shown the same lack of noxious effects.

Administered to humans in solutions of up to 50% the preparations were well tolerated. The addition of the agents to the solutions of butane-alcohols had no influence upon the toxic effects of the alcohols.

Pharmacological activity

The following test was employed to ascertain the effect upon a hemorrhage of the above mentioned agents. The tail of white mice was cut 2 millimeters from the tip and the bleeding time determined. One-half hour later, the clot formed on the wound was removed with gauze and, for the resulting second bleeding, the bleeding time was again determined. In order to judge the activity of a preparation, it was administered either by injection or introduced through a catheter into the stomach of the animal, from 5 to 15 minutes before the removal of the clot. The difference between the first and the second bleeding times indicates the anti-hemorrhagic effect. For the study of the topical anti-hemorrhagic effect, the tip of the tail was cut and introduced into the solution to be studied, the solution or the material was applied with gauze to the tail tip. The same anti-hemorrhagic effect was tested on bleeding sections of liver or kidney in rats, where a gauze soaked in the solutions was applied, or an injection with the agent, was made.

In order to judge the effect on pain, the products were administered to humans after an accident or before and after surgical intervention.

In order to judge the effect on shock, the preparations were administered to humans following accidents or surgical interventions, or to rats submitted to 200 falls in the Noble-Collip drum.

Results

The effect of the second bleeding time in mice after parenteral administration of the product alone, was manifested in examples with a reduction in the bleeding time, from 6½ minutes to 1½ minutes, or from 16 minutes to 2 minutes. This result was obtained consistently in a group of 20 mice.

From the mixture of the product with butane-alcohols, the effect on hemorrhage was remarkably good. Changes from 16 minutes to 1 minute or less, or from 6 minutes to ¾ minutes or less were seen. Most important was the fact that the anti-hemorrhagic effect was seen in all of the animals tested, an occurrence which was not observed with solutions of butane-alcohols alone, even if administered in higher doses. In the topical application, the effect was present, but less marked than by injection. With preparations having a calcium compound in their constitution the hemorrhage was seen to be stopped very rapidly, in about 15–20 seconds.

The anti-hemorrhagic effect was seen in humans, even in those cases that did not respond sufficiently to n-butanol alone. Generally the bleeding was stopped entirely a few minutes after the intramuscular administration of, for instance, 10 ml. of a preparation with 10% of the agent and 6.5% n-butanol.

The effect on pain in humans was evident. The intramuscular injection of 10 ml. of the above mentioned preparation having also amino-butanol in their composition to subjects after an accidental trauma was followed by very good sedation of the pain. The same was true for fractures. In only a few cases was a second injection of the same preparation necessary in less than 6 hours after the first injection. The intramuscular injection of 10 ml. of the above mentioned preparation, ¼ of an hour before surgical intervention, followed by another injection of 10 ml. of the same solution immediately after the intervention, was seen to control the post-operative pain. The patients remain entirely conscious, without pain, able to be mobilized even a few hours after the intervention. No retention of urine and no constipation was seen. Again, the same observation of consistency in the results, not seen with other preparations, was noted. Even after prolonged major operations, no signs of shock were seen in subjects who had been injected prior to the intervention. The symptoms and signs of shock in post-accidental cases were seen to disappear shortly after administration of the above mentioned preparations. The administration of the products prior to or immediately after the trauma induced in rats in the Noble-Collip drum, was seen to prevent the appearance of shock. If administered early enough after the trauma, it was seen to control shock even after it had started.

EXAMPLES (1) A solution of 10% of sucrose in water, is obtained and the resultant preparation sterilized and used in injections for the prevention and treatment of hemorrhage, pain and shock, and a reduction of posttraumatic noxious consequences.

(2) A solution of 10% lactose in water is prepared, sterilized and used as a preparation for parenteral administration for the prevention and treatment of the above mentioned conditions.

(3) A solution of 10% maltose is prepared, sterilized and used parenterally for the prevention and treatment of the above mentioned conditions.

(4) A solution of 10% inositol in water is prepared, sterilized and used parenterally for the prevention and treatment of the above mentioned conditions.

(5) A solution of 10% manitol in water is prepared, sterilized and used parenterally for the prevention and treatment of the above conditions.

(6) A solution of 10% sorbitol is prepared, sterilized and used parenterally for the prevention and treatment of the above mentioned conditions.

(7) Preparations are made from the above solutions and 6.5% n-butanol sterilized and used parenterally for the prevention and treatment of the above mentioned conditions.

(8) Solutions of the above mentioned agents with an 8% solution of 1,4 butanediol are prepared, sterilized and used parenterally for the prevention and treatment of the above mentioned conditions.

(9) Solutions of the above agents with 4% n-butanol and a 5% solution of 1,4 butanediol are prepared, sterilized and used for the prevention and treatment of the above mentioned conditions.

(10) A solution of 25% of inositol is prepared and used for oral administration for the prevention and treatment of the above mentioned conditions.

(11) A solution of 30% sorbitol is prepared and used for oral administration for the prevention and treatment of the above mentioned conditions.

(12) A solution of 30% manitol is prepared and used for oral administration for the prevention and treatment of the above conditions.

(13) Solutions of the above examples and 6% n-butanol are prepared and used for oral administration.

(14) Solutions of the examples and 7% butanediol are prepared and used for oral administration.

(15) A solution of 10% of the agents with 10% amino-butanol is prepared and used for the prevention and treatment of the above mentioned conditions.

(16) A solution of the above agents with 0.5% phosphoric acid are prepared and used for the prevention and treatment of the above mentioned conditions.

(17) A solution of 50% of the agents in a 3% solution of calcium acid lactate is prepared and used topically for the treatment of bleeding wounds and as local hemostatic during surgical intervention.

(18) A solution of 50% of the agents with 5% of the calcium lactate and 1% phosphoric acid is prepared and used topically for the treatment of bleeding wounds and as local hemostatic during surgical intervention.

(19) A solution of 50% of the agents with 10% of a saturated solution of calcium hydroxide and with a 7% n-butanol is prepared and used topically for the treatment of bleeding wounds and as local hemostatic during surgical interventions.

(20) A 25% solution of the agents in a 10% solution of calcium acid lactate is used for the local treatment of wounds or burns.

(21) A solution of 20% of the agents with 10% of calcium acid lactate is used together with suitable ingredients, as a spray for the local treatment of wounds or caloric, chemical or actinic burns.

(22) 20% of the basic agent is incorporated in a foamy preparation of gelatin or methyl cellulose and used as local treatment in bleeding operative or traumatic wounds.

(23) 20% of the basic agent is incorporated in suppository material and form used for the treatment of hemorrhoids.

From the foregoing it will be apparent that improved effects upon hemorrhage, pain and shock, especially as noxious effects of trauma, have been obtained by using the above mentioned agents.

I claim:

1. The method of treating for posttraumatic shock, pain, and hemorrhage in human beings and animals, which consists in administering to human beings and animals an effective amount of a material comprising
   (a) n-butanol, and
   (b) a member selected from the group consisting of maltose, inositol, and sorbitol in the relative proportions from 1:5 to 100:1 parts by weight.

2. The method of claim 1 in which the relative proportions are about 6.5% to 10% by weight.

3. A therapeutic composition for administering to human beings, and animals for treatment for past-traumatic shock, pain, and hemorrhage, which comprises (a) n-butanol, and (b) a member selected from the group consisting of maltose, inositol, and sorbitol in the relative proportions from 1:5 to 100:1 parts by weight.

4. The composition of claim 3 in which the relative proportions are about 6.5% to 10% by weight.

(References on following page)

References Cited

UNITED STATES PATENTS 3,322,629  5/1967  Dyke.

OTHER REFERENCES

Revici, Research in Physiopathology as a Basis of Guided Chemotherapy (pp. 439–451, 1961).

ALBERT T. MEYERS, Primary Examiner

STANLEY J. FRIEDMAN, Assistant Examiner

U.S. Cl. X.R.

424—343